(12) United States Patent
Young

(10) Patent No.: US 8,551,654 B2
(45) Date of Patent: *Oct. 8, 2013

(54) SECONDARY BATTERIES WITH TREATED BENTONITE CATHODES

(76) Inventor: Edgar D. Young, Sapphire, NC (US)

( * ) Notice: Subject to any disclaimer, the term of this patent is extended or adjusted under 35 U.S.C. 154(b) by 525 days.

This patent is subject to a terminal disclaimer.

(21) Appl. No.: 12/509,132

(22) Filed: Jul. 24, 2009

(65) Prior Publication Data

US 2010/0279174 A1    Nov. 4, 2010

Related U.S. Application Data

(60) Provisional application No. 61/214,919, filed on Apr. 30, 2009.

(51) Int. Cl.
*H01M 4/58* (2010.01)
*H01M 6/18* (2006.01)

(52) U.S. Cl.
USPC ............... 429/218.1; 429/231.6; 429/304; 429/209; 429/212; 429/300; 502/83; 502/85

(58) Field of Classification Search
USPC ........... 429/209–231.95; 502/60, 80–84; 252/500
See application file for complete search history.

(56) References Cited

U.S. PATENT DOCUMENTS

| | | | |
|---|---|---|---|
| 4,797,333 A | 1/1989 | Coetzer et al. | |
| 4,975,344 A | 12/1990 | Wedlake et al. | |
| 5,324,599 A * | 6/1994 | Oyama et al. | 429/312 |
| 5,965,299 A * | 10/1999 | Khan et al. | 429/313 |
| 6,136,909 A * | 10/2000 | Liao et al. | 524/446 |
| 6,316,141 B1 | 11/2001 | Aurbach et al. | |
| 6,713,212 B2 | 3/2004 | Aurbach et al. | |
| 7,063,808 B1 | 6/2006 | Viswanathan | |
| 8,445,134 B2 * | 5/2013 | Young | 429/218.1 |
| 2003/0143467 A1 * | 7/2003 | Riley et al. | 429/304 |
| 2007/0009804 A1 * | 1/2007 | Dixon et al. | 429/306 |

FOREIGN PATENT DOCUMENTS

| | | | | |
|---|---|---|---|---|
| CN | 85103963 A | * | 11/1986 | H01M 4/58 |
| JP | 60086760 A | * | 5/1985 | H01M 4/46 |
| JP | 09115505 A | * | 5/1997 | H01M 4/02 |

OTHER PUBLICATIONS

"Montmorillonite Mineral Data." Mineralogy Database. Web. Feb. 8, 2012. <http://webmineral.com/data/Montmorillonite.shtml>.*
Liu et al., "Ionic conductance or smectite intercalation compounds", Solid State Ionics 82 (1995) p. 225-227.*
Machine translation for Yamazaki et al., JP 09-115505 A.*
Derwent Abstract for Liao et al., US 6,136,909.*
Hand translation for Toyoguchi et al., JP 60-086760 A.*
Bakhmatyuk, B.P. et al., "Intercalation of Bentonite: Thermodynamics, Kinetics, and Practical Applications," Inorganic Materials, vol. 43, No. 5 (May 2007), pp. 537-540.

* cited by examiner

*Primary Examiner* — Edu E Enin-Okut
(74) *Attorney, Agent, or Firm* — Charlotte C. Wilson

(57) ABSTRACT

Provided herein is an electrochemical cell for a secondary battery, which includes a positive electrode having an active intercalation cathode material of treated bentonite; a negative electrode material having an active anode material containing one of magnesium and sodium; an electrolyte positioned in contact with at least one of the positive electrode and the negative electrode; wherein, when the active anode material contains magnesium, the electrolyte is a solid gel polymeric electrolyte; and wherein, when the active anode material is sodium, the electrolyte is a salt electrolyte, both the anode material and the electrolyte are molten at the operating temperature of the battery, and the cell further comprises a beta alumina solid electrolyte separator between the negative electrode and the electrolyte.

10 Claims, 1 Drawing Sheet

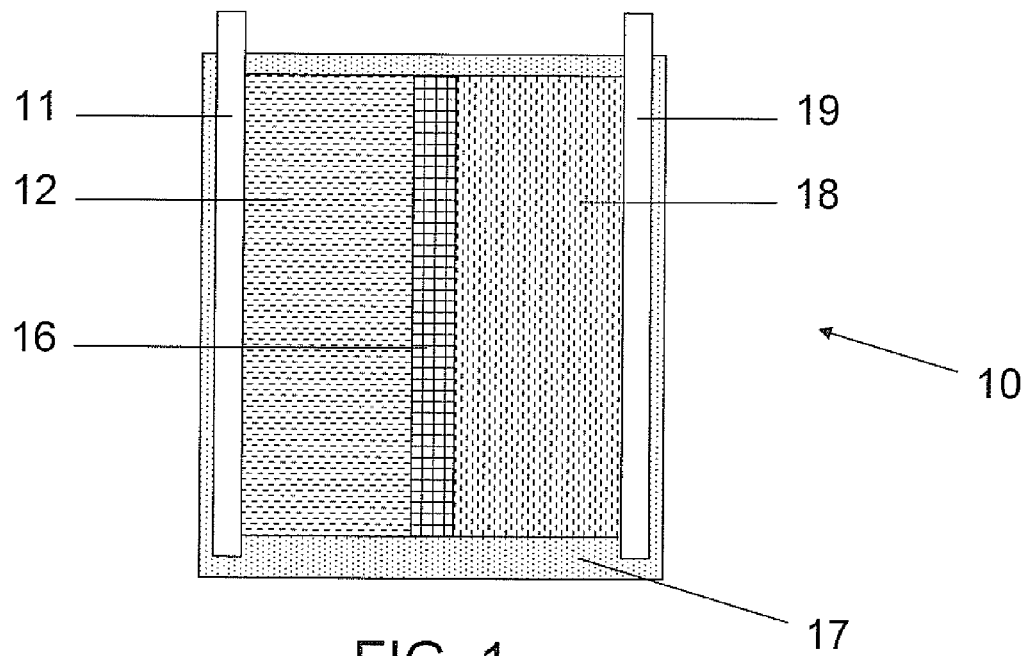
- FIG. 1 -
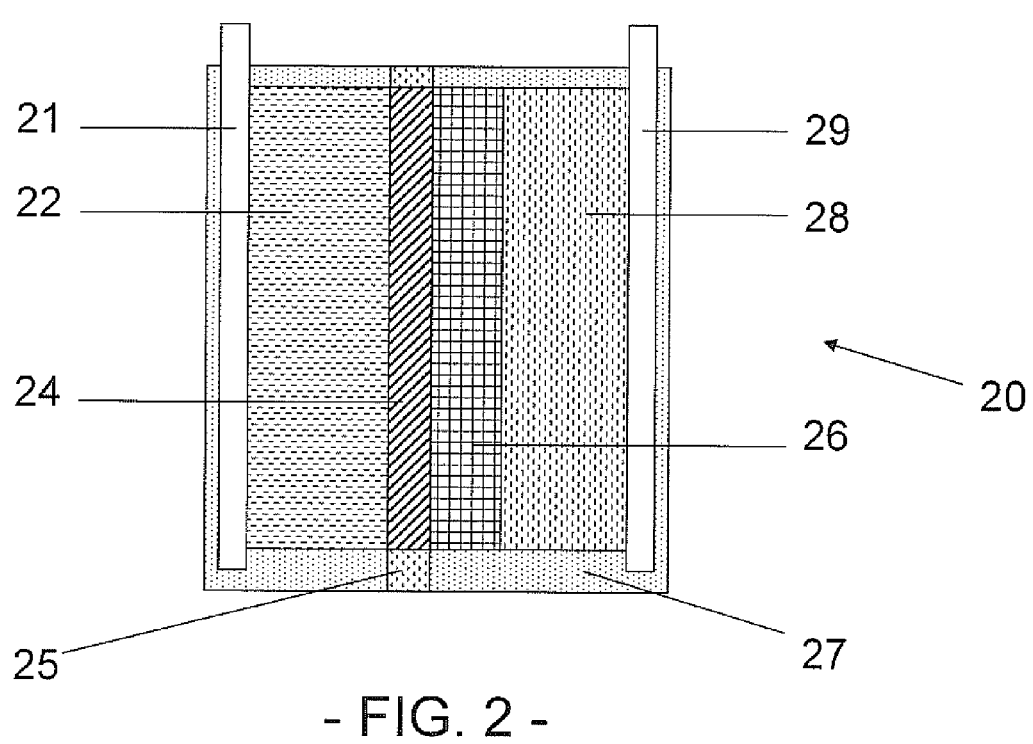
- FIG. 2 -

SECONDARY BATTERIES WITH TREATED BENTONITE CATHODES

CROSS-REFERENCE TO RELATED APPLICATIONS

This application is a non-provisional application, claiming benefit of, and priority to, U.S. Provisional Application Ser. No. 61/214,919, filed Apr. 30, 2009, the disclosure of which is hereby incorporated by reference in its entirety.

TECHNICAL FIELD

The present disclosure is directed to the field of secondary batteries, and, more specifically, to batteries in which the active material of the positive electrode (or cathode) is a treated bentonite clay. In one version, the active material of the negative electrode (or anode) material is magnesium or a magnesium alloy, and the electrolyte is a solid gel polymeric electrolyte. In a second version, a molten salt battery is created in which the active material of the anode is sodium, and the electrolyte is a salt, both of which are molten at the operating temperature of the battery.

BACKGROUND

Secondary batteries are batteries in which the chemical reaction that generates electrical energy is electrically reversible. Commonly used secondary cell ("rechargeable battery") chemistries are lead-acid (such as a conventional automobile battery), nickel cadmium (NiCd), nickel metal hydride (NiMH), lithium ion (Li-ion), and lithium ion polymer (Li-ion polymer). These batteries offer the benefit of repeated use and recharging, thereby extending the life of the battery as compared to a conventional primary battery, in which the electricity-producing chemical reaction is a one-way reaction that eventually consumes the component materials.

In recent years, the use of lithium-ion (Li-ion) batteries has expanded from small appliance applications to larger scale applications. Most recently, Li-ion batteries have been considered for use in electric vehicles, such as gas-electric hybrid automobiles and electric-only automobiles. Although such batteries are effective in many of these applications, insufficient thought appears to have been given to the availability of lithium, as compared to the world demand for lithium for use in batteries for conventional purposes, as well as for transportation.

World reserves of lithium are currently estimated to be on the order of about twenty-eight million tons, making lithium one of the more uncommon elements on the Earth's surface. Only about four hundred thousand tons of lithium are located within the borders of the United States, with the bulk of the world's reserves are located within Bolivia, China, and Russia. As demand for lithium continues to increase worldwide, one can readily predict that other countries and regions may seek to control their supply of lithium, either for their own internal use or to inflate market price.

To have adequate capacity for practical use by consumers, a typical plug-in hybrid car requires a battery pack weighing at least six hundred pounds, at least forty pounds of which is lithium. To convert the entire population of three hundred million automobiles in the United States to a lithium-based battery system would require about six million tons of lithium, exceeding the U.S. supply of lithium by a factor of fifteen to one.

Extrapolating the situation worldwide to a population of roughly eighteen times that of the United States, a conservative estimate for lithium demand would be approximately sixty million tons, thus exceeding the global supply of lithium by a factor of more than two to one.

Because lithium is fairly rare, some battery manufacturers have sought to produce effective battery systems using more abundant materials, such as magnesium, which has been explored with some degree of success. Magnesium batteries have substantial promise as rechargeable systems for many battery applications, including the electric car, portable electronics, and tools. Whereas alkali metals (such as lithium) are highly flammable and may be poisonous, alkaline earth metals (such as magnesium) are easy to process and exhibit stable behavior. Additionally, magnesium is the third most common metal that can remain unprotected in the Earth's atmosphere, with the world reserves of magnesium being on the order of at least eight billion tons. Moreover, vast amounts of magnesium salts are dissolved in sea water.

U.S. Pat. No. 6,316,141 describes a magnesium battery that has a magnesium anode, a molybdenum-containing intercalation cathode, and a non-aqueous electrolyte comprising an organic solvent and an electrolytically active salt. Potential shortcomings of this battery, however, are the limited worldwide availability of molybdenum, the use of potentially hazardous solvents, and design constraints associated with a liquid electrolyte.

As compared to a lithium battery, a magnesium battery may require approximately twice as much metal—that is, about eighty pounds per battery pack. With this greater requirement, the world demand for magnesium batteries (for vehicle usage alone) could possibly reach as much as twelve million tons. However, because of the abundance of magnesium, the global supply of magnesium far exceeds the demand by a factor of at least six hundred fifty to one.

Another metal that has been investigated for use in batteries as an alternative to lithium is sodium. Sodium is attractive for such use because of its high reduction potential, its low weight, its non-toxic nature, its relative abundance and ready availability, and its low cost. In order to construct practical batteries, the sodium must be used in liquid, or molten, form and must be kept isolated from moisture, including humidity in ambient air.

An example of a commercially viable sodium battery was developed in 1985 by the Council for Scientific and Industrial Research in Pretoria, South Africa. The battery, which was invented by the Council's Zeolite Battery Research Africa Project (nicknamed "ZEBRA"), is described, among other places, in U.S. Pat. No. 4,975,344, the entire disclosure of which is hereby incorporated by reference. The ZEBRA battery includes an anode of molten sodium, an electrolyte of molten sodium chloroaluminate ($NaAlCl_4$), a cathode of nickel or another transition metal in the discharged state (a metal chloride when charged), and a ceramic separator of sodium ion-conducting beta-alumina to prevent contact between the molten sodium anode and the $NaAlCl_4$ electrolyte. The technical name for the battery is sodium-nickel chloride (Na—$NiCl_2$) battery, but it is commonly referred to as the "ZEBRA battery."

The ZEBRA battery's liquid electrolyte solidifies below its melting point of 157° C. (314.6° F.), and the normal operating temperature range is typically between 250° C. (482° F.) and 350° C. (662° F.). The β-alumina solid electrolyte (BASE) that is employed as a membrane, or separator, within this system is very stable, both to the sodium metal anode and the sodium chloroaluminate electrolyte. The primary elements used in the manufacture of ZEBRA batteries—that is, sodium, chloride, and aluminum—have much higher worldwide reserves and annual production than the lithium used in lithium-ion batteries discussed above.

One potential shortcoming of the ZEBRA battery, which may prevent its widespread adoption, is the reliance upon nickel as the cathode material. The estimated world reserves of nickel are on the order of about eight hundred million tons, closer to those of lithium (twenty-eight million tons) than magnesium (eight billion tons). Worldwide adoption of the ZEBRA battery as the primary type of automotive battery would quickly deplete the available global reserves, thereby reinforcing the need for a battery that utilizes more abundant materials.

Accordingly, a need exists in the industry for a durable battery made of readily abundant materials, which may be easily assembled and repeatedly recharged. The present disclosure addresses such need.

SUMMARY

Provided herein is an electrochemical cell for a secondary battery, which includes a positive electrode having an active intercalation cathode material of treated bentonite; a negative electrode material having an active anode material containing one of magnesium and sodium; an electrolyte positioned in contact with at least one of the positive electrode and the negative electrode; wherein, when the active anode material contains magnesium, the electrolyte is a solid gel polymeric electrolyte; and wherein, when the active anode material is sodium, the electrolyte is a salt electrolyte, and both the anode material and the electrolyte are molten at the operating temperature of the battery; and wherein the cell further comprises a beta alumina solid electrolyte separator between the negative electrode and the electrolyte.

According to one aspect, the treated bentonite cathode material exhibits increased rigidity from having been fired in a kiln or oven, while in a discharged state.

According to another aspect, the active anode material is a magnesium/aluminum alloy.

The electrolyte used in conjunction with the magnesium-containing anode material is a solid gel polymeric electrolyte which possesses an amorphous structure and at least one phosphorous group.

In another variation, the active anode material is molten sodium and the molten salt electrolyte is selected from an alkali halide salt, an alkali chromoaluminate salt, and mixtures thereof. Further, according to this aspect, the molten salt electrolyte includes sodium chloride. Alternately, according to this aspect, the molten salt electrolyte includes sodium chloroaluminate.

In some instances, it may additionally be desirable for the molten salt electrolyte to contain an ionic organic solvent.

When the active anode material is sodium, the separator material may be made of sodium beta aluminum.

BRIEF DESCRIPTION OF THE DRAWINGS

A full and detailed disclosure is set forth in the accompanying specification, which makes reference to the appended figures, in which:

FIG. 1 is a schematic representation of a first battery, which is provided with a magnesium-based anode, according to the teachings herein; and FIG. 2 is a schematic representation of a second battery, which is a molten salt battery provided with a sodium-based anode, according to the teachings herein.

DETAILED DESCRIPTION

Reference is now made to the drawings for illustration of various components of the present electrochemical cells.

While the particular illustrations provided herein are directed to a magnesium-based battery and a sodium-based battery, various elements and embodiments may be equally applicable to batteries containing other alkali and alkaline earth metals. Moreover, while the electrochemical cells are shown as individual units, multiple cells may be cooperatively engaged to form a larger battery. Further, whereas the electrochemical cells are shown as having a substantially rectangular shape, the component materials may be assembled to create cells having other shapes, such as cylindrical, in which the anode material is housed within a tube made of a separator material, and the electrolyte is impregnated within the cathode material in the area surrounding the separator tube.

Cathode

As referred to herein, the "cathode" material is the part of the cell that, during use, oxidizes the anode or absorbs electrons. When the cell is discharging electricity, the positive electrode is the cathode. Conversely, when the cell is being recharged, the polarity is reversed, and the negative electrode is the cathode. For ease of discussion, descriptions of the cathode that follow are made in reference to the positive electrode and to the electron-absorbing state of the cathode material, unless otherwise specifically stated.

Generally speaking, for secondary batteries that will be recharged at ambient temperatures, such as the magnesium batteries described herein, the cathode (or "positive electrode") may be either a liquid cathode or a solid cathode. While liquid cathodes facilitate the reaction process and preserve high activity level, care must be taken to prevent contact between the liquid cathode and the anode, which would short-circuit the cell.

Solid cathodes, on the other hand, are most easily incorporated in those situations in which the cathode material is insoluble in the electrolyte material, and the cathode material is capable of quickly and reversibly receiving and releasing a charge-compensating ion. An intercalation cathode is a prime example of a solid cathode of this variety. Intercalation chemistry focuses on the insertion of ions or neutral molecules into an inorganic or organic matrix. In a typical intercalation cathode, cations dissolved in the electrolytic solution are inserted into an inorganic matrix structure.

One particularly abundant intercalation material is natural bentonite (sometimes referred to as "bentonite clay"), which is an aluminum silicate clay formed of volcanic ash. The primary atomic constituents of bentonite clay are silicon and aluminum, which are ranked second and third, respectively, in terms of abundance in the Earth's crust, with only oxygen being more abundant. In addition to being abundant and readily available, silicon and aluminum are relatively benign elements and are easily handled. Moreover, bentonite itself is an abundant material worldwide.

Bentonite is classified in the smectite family as any one of a group of clay minerals and their chemical varieties that swell in water and that possess high cation-exchange capacities. Because of these high cation-exchange properties, bentonite is an effective material for use as a cathode. Natural bentonite clay may be chemically modified, for example, by treating with sulfuric acid, to extract a portion of the alkali and alkaline earth components, so that the final product (that is, the chemically modified natural bentonite or "treated bentonite") has the form of a broken silica framework. This broken silica framework has been found to be receptive to the electrochemical intercalation, or introduction, of these same alkali and alkaline earth metal ions, thereby providing an effective mechanism for the electrochemical transfer characteristic of a battery system.

The movement of metal ions from the anode into, and out of, the intercalation material—in this case, the acid-treated bentonite—generates a flow of electrons that produces electrical energy. Since the process is reversible, intercalation cathodes made of bentonite are well-suited for use as positive electrodes in electrochemical cells. These properties are documented by B. P. Bakhmatyuk et al., in "Intercalation of Bentonite: Thermodynamics, Kinetics, and Practical Applications," *Inorganic Materials*, Vol. 43, No. 5 (May 2007), pp. 537-540, the disclosure of which is hereby incorporated by reference in its entirety.

The treated bentonite cathodes (in a discharged state) may be fired briefly in an oven or kiln to enhance their rigidity, as compared to the un-fired cathodes.

The cathode-active material in the high energy density, rechargeable battery is paired with a suitable anode-active material, which is most commonly made of an active metal, such as an alkali metal (e.g., sodium) or an alkaline earth metal (e.g., magnesium), as will be discussed below. A compatible electrolyte is chosen to enhance the ion-exchange properties of the cathode and anode, examples of which are provided further herein.

Anode

As referred to herein, the "anode" material is the part of the cell that, during use, releases, or gives up, electrons. When the cell is discharging electricity, the negative electrode is the cathode. Conversely, when the cell is being recharged, the polarity is reversed, and the positive electrode is the anode. For ease of discussion, descriptions of the anode that follow are made in reference to the negative electrode and to the electron-releasing state of the anode material, unless otherwise specifically stated.

Magnesium and aluminum metal are useful as active anode materials because they are easy to process, non-toxic, and non-hazardous. Magnesium and aluminum are reactive, but do not undergo rapid reaction at the surface, thereby rendering anodes made of one or both of these materials highly stable. Because of their abundance, magnesium and aluminum are also inexpensive, as compared with alkali metals, such as lithium. In one instance, the anode material may be made of magnesium. Alternately, a magnesium/aluminum alloy may be used, in which the majority of the anode material is made of magnesium and aluminum is present in minimal amounts.

When used in combination with the treated bentonite cathode described above and a compatible electrolyte, magnesium ($Mg^{+2}$) ions migrate into and out of the silica framework, thereby generating a flow of electrons that produces an electric current.

Yet another material compatible with the aforementioned treated bentonite cathode is sodium. A sodium anode may be cooperatively engaged with a treated bentonite cathode within a molten salt battery. In this environment, sodium ($Na^+$) ions move readily into and out of the molecular lattice of the treated bentonite. Because of sodium's high reactivity, anodes made of sodium are handled in a manner that prevents exposure to moisture, including water vapor in the air.

The functionality of molten salt batteries is temperature-dependent, primarily because the compatible electrolytes are used in a molten form. Often, the electrolytes have a melting point higher than that of sodium (about 98° C., or 208.4° F.), in which case the sodium anode is also molten at the operating temperature of the battery. At these high temperatures, typically at least 250° C. (482° F.), a separator (discussed below) is positioned between the molten sodium anode and the molten salt electrolyte.

Electrolyte

Certain electrolytes are known to perform well with a particular cathode-anode couple and to be ineffective or significantly less effective with other cathode-anode couples, either because the electrolyte is not inert or because it degrades during cycling. Thus, the choice of electrolyte impacts the function of the battery and merits attention.

Recently, the use of solid polymeric electrolytes has been explored for advanced battery systems. The substitution of a solid gel polymeric electrolyte for a conventional liquid electrolyte provides advantages with safety, design flexibility, and simplicity of production equipment and process operation.

When a magnesium-based anode is used, the electrolyte may be a solid gel polymeric electrolyte in the form of an amorphous heteroatomic polymer, such as that described in U.S. Patent Application Publication No. US 2007/0009804 to Dixon et al., the entirety of which is hereby incorporated by reference. The term "amorphous" means lacking a uniform crystalline structure.

In the representative publication to Dixon et al. mentioned above, a new class of safe electrolytes for magnesium batteries is disclosed, in which inorganic elements are combined with organic carbon segments to form a thermodynamically stable material. Such material combines acid elements with organic spacers to produce a new material with an amorphous character and distinct physical and chemical characteristics. The incorporation of covalently bound phosphorous moieties within the electrolyte material imparts the property of fire resistance to the material as a whole, as well as enhancing ionic conductivity and overall battery performance.

As used herein, the term "solid gel polymeric electrolyte" shall refer to an electrolyte formulation composed of a magnesium salt or an organometallic compound combined with a monomer, oligomer, or polymer with saturated alkyl or fluoroalkyl carbon links that connect alternating nitrogen, sulfur, or oxygen atoms through saturated alkyl or fluoroalkyl carbon spacers to at least one of an oxy-silicon group, an oxy-boron group, an oxy-aluminum group, and an oxy-phosphorous group, in which the phosphorous atom in the oxy-phosphorous group is either valence III or valence V.

One general embodiment of the solid gel polymeric electrolyte can be summarized by Formula I, shown by the following drawing.

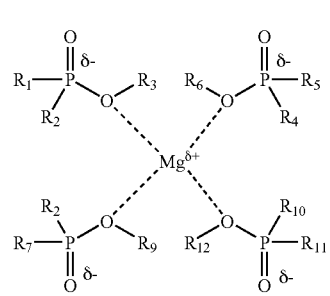

Formula I where $R_1$-$R_{12}$ are independently selected alkyl, aryl, alkoxy or aryloxy groups, including monomeric, oligomeric and polymeric molecules derived therefrom, as well as siloxane derivatives.

The following representation Formula Ia is another variation of Formula I, where R is an alkyl, aryl, alkoxy or aryloxy group, including monomeric, oligomeric and polymeric molecules derived therefrom, as well as siloxane derivatives:

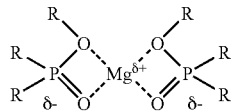

Formula Ia

Another embodiment of the solid gel polymeric electrolyte is shown by Formula II, in which $R_1$-$R_4$ are independently selected from alkyl, aryl, alkoxy, and siloxane groups, including oligomers and polymers thereof:

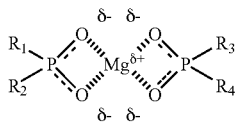

Formula II

In this instance, the magnesium cation is tonically bound to the phosphorus ester groupings. The magnesium ion, with a partial positive charge (δ+), can be either an inherent part of the phosphorous-based entity, or incorporated as in a salt form, such as magnesium trifluoromethane sulfonate (triflate) or tetrafluoroborate, or an organometallic (metallo-organic), such as a Grignard reagent.

The various elements are connected using hydrocarbon or fluorocarbon spacers, an example of which is the —CH2—CH2— ethylene linkage, and the entire molecule forms a heteroatomic entity. If polymeric or oligomeric, the heteroatomic entity can be of a molecular weight in the range of from 400 MW to 1,000,000 MW. The array of ethylene spacer and element groups, i.e.,

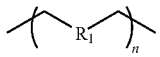

can vary from an even distribution of each ethylene spacer and element group to an uneven distribution.

Instead of using ethylene carbon spacers in the solid gel polymer, the elements can also be connected using propylene, butylenes, or phenylene spacers. In addition, combinations of ethylene and propylene, phenylene, or butylene spacers can be used to connect the heteroatomic elements in the polymer. The spacers can also have alternating odd and even numbers of —CH2— or —CF2— links. Such arrangements will ensure greater amorphous character in the polymer. Fluorocarbon analogs to these hydrocarbon groups can also be employed together with hydrocarbon groups or in direct replacement for hydrocarbon groups.

In addition to using the select elements directly, in certain circumstances, some of these select elements can contain organic substituents that modify the characteristics of the solid gel polymeric electrolyte. For example, in the case of phosphorous or nitrogen, an organic substituent can be added prior to polymerizing the monomers used to prepare the polymer of the formula:

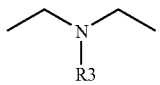

in which the $R_3$ group can be aromatic or aliphatic in nature, including, but not limited to, an alkyl or aryl group, e.g., methyl, phenyl, nitrophenyl, or aminophenyl group. The same circumstances apply when phosphorous is present in the trivalent state. In this latter instance, the phosphorous atom could be connected to ethylene groups via an oxygen atom, or could be bonded directly to the carbon of the ethylene group or similar alkyl or fluoroalkyl substituent or spacer. Again, the species with phosphorus in either the +3 or +5 oxidation state are viable.

In another version, the solid gel polymeric electrolyte could be created according to Formula III:

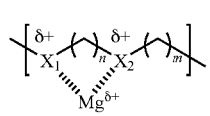

Formula III where $X_1$ is an element chosen from the group N, B, and S; $X_2$ is an element chosen from the group O and P, including P in the form of phosphine, phosphonate, and phosphate moieties; and n and m are integers independently selected between 1 and 8. Alternately, $X_1$ can be O while $X_2$ is P in this compound. In all cases, phosphorous can be in the trivalent (+3) or pentavalent (+5) oxidation state. Once again, these elements are connected using ethylene, propylene, butylene, or phenylene spacers, and the entire molecule can form a heteroatomic polymer. The polymer can be of a molecular weight in the range of from 400 MW to 1,000,000 MW.

The array of alkylene element groups, i.e.,

can vary from an even distribution of each distribution of ethylene element group to an uneven distribution in ratios of 2 $R_1$ groups to one $R_2$ group to 5 $R_1$ groups to 1 $R_2$ group. Besides using ethylene carbon spacers in this polymer, the elements can also be connected using propylene, phenylene, and butylene spacers. In addition, combinations of ethylene, propylene, phenylene, and butylene spacers can be used to connect the heteroatomic elements in the polymer. These alkyl or fluoroalkyl spacers could be branched with alkyl or fluoroalkyl side chains emanating from the backbone of the spacer group.

These solid gel electrolytes exhibit high conductivity and promote the substantial reversibility of the deposition of metal from the anode material (for example, magnesium) and reversibility of the intercalation process at the cathode material (that is, the treated bentonite clay, as described herein).

A different type of electrolyte is useful when creating a molten salt battery. When molten sodium is used as the anode material, the electrolyte may be a molten salt, such as an alkali halide salt or an alkali chloroaluminate salt. Examples of such salts include sodium halide salts and sodium chloroaluminate salts. One particularly abundant and inexpensive example is sodium chloride, although sodium fluoride may instead be used. Mixtures of these salts may also be used. Additionally, an organic solvent—for example, (trifluoromethylsulfonyl)imide (TFSI) or a similar ionic liquid—may be incorporated with one or more salts to reduce the melting point of the salts, thereby promoting ionic exchange.

Separator or Membrane

No separator is required for the magnesium/solid gel polymer/treated bentonite battery.

No separator is required in the sodium/molten salt/treated bentonite battery, when the melting point of the electrolyte is less than the melting point of sodium. However, when the melting point of the electrolyte used in the molten salt battery is equal to or higher than the melting point of sodium, a separator is provided between the anode and the electrolyte to prevent the molten sodium anode from contacting the molten salt electrolyte. The separator may be a beta alumina solid electrolyte (BASE), or some other similarly suitable ceramic material. Beta alumina solid electrolyte (BASE) is a fast ion conductor material used as a membrane, or separator, in several types of molten salt electrochemical cells. There is no known substitute.

Beta alumina is a form of aluminum oxide ($Al_2O_3$), a hard polycrystalline ceramic, which is a good conductor of mobile ions (such as $H^+$, $Li^+$, $Na^+$, $K^+$, $Ag^+$, $Sr^{2+}$, $Ba^{2+}$, and $Pb^{2+}$), but which allows no non-ionized conductivity. As used herein, the term "beta alumina" refers to both beta ($\beta$) alumina and beta-prime-prime ($\beta''$) alumina, which are subgroups of a larger class of oxides. Beta ($\beta$) alumina is stacked according to a twofold screw axis, contains a mirror plane through the layers of mobile cations, and results in hexagonal crystal structures. Beta-prime-prime ($\beta''$) alumina is stacked according to a three-fold screw axis, lacks a mirror plane through the layers of mobile cations, and results in rhombohedral crystal structures. Because of the stacking pattern, the unit cell of the beta-prime-prime ($\beta''$) alumina is approximately 50% larger than that of beta ($\beta$) alumina.

Sodium beta alumina may be particularly useful in the molten salt batteries described herein, since such sodium aluminum oxide is capable of rapid transport of $Na^+$ ions, while containing all other liquids (such as liquid or molten sodium). The crystal structure has a non-stoichiometric structure having the general formula $(Na_2O)_{x+1} \cdot 11(Al_2O_3)$, where, in practice, x ranges from 0.25 to 0.55 in an undoped material and up to 0.66 when magnesium is present in the crystal. This crystal network provides a rigid framework with channels along which the sodium ions can migrate by moving from site to site along the channels.

As when used in ZEBRA batteries, the beta alumina membrane used in the present molten salt batteries has a low resistivity, which must be stable in the cell or battery for up to 10 years. The beta-alumina may be made by a low-cost variation of the sol-gel process, resulting in a thin-walled convoluted tube with a strength of at least 200 MPa.

Assembly

FIG. 1 provides a schematic illustration of an electrochemical cell 10 having an active anode layer 12 of magnesium or a magnesium-based alloy; an active cathode layer 18 of treated bentonite; and an electrolyte layer 16 of a solid gel polymer electrolyte (as described herein), which is positioned between the active anode material 12 and the active cathode material 18. Electrical terminals 11, 19 are positioned in contact with the electrode materials 12, 18, respectively. These terminals 11, 19 may be made of materials including, but not limited to, carbon, copper, nickel, lead, gold, and other similar electrically conductive metal or metal alloy. The active anode material 12, the electrolyte 16, and the active cathode material 18 are held within a housing 17, which permits handling of the electrochemical cell 10. The housing 17 is a non-electrically conductive material, such as a plastic or rubber material.

To prepare the solid gel polymer electrolyte 16, the amorphous solid described above is dissolved in an alkyl alcohol (e.g., ethyl alcohol) or other suitable solvent and is deposited onto a surface to allow evaporation to form an electrolyte film. Alternately, the dissolved polymer may be deposited onto a sponge or similarly absorbent material, thereby saturating the sponge. The active materials of the anode and the cathode may then be positioned on opposite sides of the saturated sponge, thereby compressing the sponge before evaporation can occur and melding the electrolyte within the cell unit.

In some instances, it may be desirable to secure the terminals 11, 19 to the respective electrode materials 12, 18 by an electrically-conductive binder material (not shown in the drawing). U.S. Pat. No. 7,063,808, the disclosure of which is hereby incorporated by reference in its entirety, describes examples of such binders, which are composites made of a synergistic blend of a conductive carbon material and either a lignosulfonic acid-doped polyaniline or a sulphonated asphalt-polyaniline. The resulting composite exhibits a greater conductivity than the respective components individually.

Power density of the batteries resulting from the connection of multiple electrochemical cells, as described above, is affected by the thickness of the material layers (12, 16, and 18). Slender cells assembled in parallel to form super cells tend to exhibit lower electrical/mechanical resistance per unit mass without comparable changes in thermal resistance, thus allowed power density to be optimized at the discretion of the manufacturer.

The electrochemical cells 10 utilize abundant, readily available, non-toxic, and flame resistant starting materials for the active anode material 12, the electrolyte 16, and the active cathode material 18 to produce an economical and efficient battery. Further, these cells 10 exhibit the energy density and longevity necessary for use in large applications, such as plug-in hybrid-type vehicles.

FIG. 2 provides a schematic illustration of an electrochemical cell 20 having an active anode layer 22 of sodium, which is molten at the operating temperature of the cell 20; an active cathode layer 28 of treated bentonite, which may have been fired to increase its rigidity; a separator 24 of beta alumina, which is located adjacent to the active anode layer 22; and an electrolyte layer 26 of an alkali halide salt or an alkali chloroaluminate salt, which is also molten at the operating temperature of the cell 20. The electrolyte material 26 may be positioned between the beta alumina separator 24 and the active cathode material 28 (as shown) or may impregnate the active cathode material 28, thereby creating the appearance of a single, integrated layer. As before, electrical terminals 21, 29 are positioned in contact with the electrode materials 22, 28, respectively. As above, these terminals 21, 29 may be made of materials including, but not limited to, carbon, copper, nickel, lead, gold, and other similar electrically conductive metal or metal alloy.

The active anode material 22, the separator or membrane 24, the electrolyte 26, and the active cathode material 28 are held within a housing 27, which permits handling of the electrochemical cell 20. The housing 27 is a temperature-durable, non-electrically conductive material, such as mild steel. The part of the housing 27 in contact with the anode 22 is insulated from the part of the housing in contact with the cathode 28, e.g., by insulating material 25. To accommodate changes in volume in the anode and/or cathode that may occur during charging and discharging, the cell 20 may be provided with flexible housing walls or inert gas spaces (not shown) in one or both of the anode and cathode compartments.

Because of the high operating temperatures used to maintain the sodium anode 22 and the electrolyte 26 in a molten state, it is desirable to keep batteries containing these electrochemical cells 20 under charge, even when not in use. Once the battery is shut down completely, three or four days may elapse before the battery cools and solidifies, depending on the mass of the battery. Once the sodium anode 22 and the electrolyte 26 have solidified, the user of the battery initiates a reheating process to restore the battery to a desired temperature and to impart a full charge. The degree of charge of the battery at the time of shut down, the battery temperature, and the power available for recharging influence the reheating time. This reheating process may take up to two days, again depending on battery size and the factors listed above.

The electrochemical cells 20 described above are produced using readily available and relatively inexpensive materials. These cells 20 are also durable and may be constructed to exhibit a long lifespan, estimated to be on the order of 1,000 cycles. In addition to being used in vehicles, the sodium/bentonite batteries could be used for storing energy at electrical sub-stations.

The preceding discussion merely illustrates the principles of the present battery systems. It will thus be appreciated that those skilled in the art may be able to devise various arrangements, which, although not explicitly described or shown herein, embody the principles of the inventions and are included within their spirit and scope. Furthermore, all examples and conditional language recited herein are principally intended expressly to be only for pedagogical purposes and to aid the reader in understanding the principles of the inventions and the concepts contributed by the inventor to furthering the art and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawings, which are to be considered part of the entire description of the invention. The foregoing description provides a teaching of the subject matter of the appended claims, including the best mode known at the time of filing, but is in no way intended to preclude foreseeable variations contemplated by those of skill in the art.

I claim:

1. An electrochemical cell for a secondary battery, the electrochemical cell comprising:
    a positive electrode having an active intercalation cathode material with a reactive component, wherein the reactive component consists of treated bentonite, and wherein the treated bentonite has a broken molecular framework partially stripped of alkali and alkaline earth components;
    a negative electrode having an active anode material comprising magnesium; and
    an amorphous co-polymer electrolyte positioned in contact with at least one of the positive electrode and the negative electrode.

2. The electrochemical cell of claim 1, wherein the treated bentonite has greater rigidity from having been fired in a discharged state in an oven or kiln before being assembled in the electrochemical cell, such rigidity being greater than the rigidity of a comparable treated bentonite cathode not fired in an oven or kiln.

3. The electrochemical cell of claim 1, wherein the active anode material is a magnesium/aluminum alloy.

4. The electrochemical cell of claim 1, wherein the electrolyte is a solid gel polymeric electrolyte.

5. The electrochemical cell of claim 4, wherein the solid gel polymeric electrolyte comprises at least one phosphorous group.

6. An electrochemical cell for a secondary battery, the electrochemical cell comprising:
    a positive electrode having an active intercalation cathode material with a reactive component, wherein the reactive component consists of treated bentonite, and wherein the treated bentonite has a broken silica framework partially stripped of alkali and alkaline earth components;
    a negative electrode having an active anode material comprising magnesium; and
    an electrolyte positioned between the positive electrode and the negative electrode, the electrolyte being a solid gel polymeric electrolyte possessing an amorphous structure.

7. The electrochemical cell of claim 6, wherein the active anode material is a magnesium/aluminum alloy.

8. The electrochemical cell of claim 6, wherein the solid gel polymeric electrolyte comprises at least one phosphorous group.

9. The electrochemical cell of claim 6, wherein the treated bentonite has greater rigidity from having been fired in a discharged state in an oven or kiln before being assembled in the electrochemical cell, such rigidity being greater than the rigidity of a comparable treated bentonite cathode not fired in an oven or kiln.

10. The electrochemical cell of claim 6, wherein the solid gel polymeric electrolyte comprises a magnesium salt or an organometallic compound in combination with a monomer, oligomer, or polymer having saturated alkyl or fluoroalkyl carbon links connecting alternating nitrogen, sulfur, or oxygen atoms through saturated alkyl or fluoroalkyl carbon spacers to at least one of an oxy-silicon group, an oxy-boron group, an oxy-aluminum group, and an oxy-phosphorous group, in which the phosphorous atom in the oxy-phosphorous group is either valence III or valence V.

* * * * *